US012761020B2

(12) United States Patent
Engin et al.

(10) Patent No.: US 12,761,020 B2
(45) Date of Patent: Oct. 13, 2026

(54) MACHINING SYSTEM AND METHOD FOR VALIDATING DIMENSIONAL MEASUREMENT DEVICE OPERATION

(71) Applicant: Pratt & Whitney Canada Corp., Longueuil (CA)

(72) Inventors: Serafettin Engin, Brossard (CA); Rachid Guiassa, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 278 days.

(21) Appl. No.: 18/377,483

(22) Filed: Oct. 6, 2023

(65) Prior Publication Data

US 2025/0116513 A1 Apr. 10, 2025

(51) Int. Cl.
*G05B 19/401* (2006.01)
*B25J 9/16* (2006.01)
(Continued)

(52) U.S. Cl.
CPC .......... *G01B 21/042* (2013.01); *B25J 9/1692* (2013.01); *B25J 11/005* (2013.01)

(58) Field of Classification Search
CPC .... G01B 21/042; G01B 21/045; G01B 21/06; G01B 21/08; B25J 9/1692; B25J 11/005;
(Continued)

(56) References Cited

U.S. PATENT DOCUMENTS 5,189,624 A 2/1993 Barlow
6,161,055 A 12/2000 Pryor
(Continued)

FOREIGN PATENT DOCUMENTS

CN 114625107 A 6/2022
DE 102015205569 B4 * 12/2022 ............ G01B 5/012
(Continued)

OTHER PUBLICATIONS

EP Search Report for EP Patent Application No. 24205086.2 dated Mar. 10, 2025.

*Primary Examiner* — Robert R Raevis
(74) *Attorney, Agent, or Firm* — Getz Balich LLC

(57) ABSTRACT

A machining system includes a machining assembly, one or more dimensional measurement devices, and a controller. The machining assembly includes an arm and a machining tool. The arm is operable to move the machining tool relative to a workpiece. Each dimensional measurement device of the one or more dimensional measurement devices is operable to measure one or both of a position or a dimension of the workpiece. The controller is configured to identify the one or more dimensional measurement devices connected in signal communication with the controller, identify a calibration requirement for each of the one or more dimensional measurement devices, identify the calibration requirement is satisfied or unsatisfied for each of the one or more dimensional measurement devices, and control the arm, the machining tool, and the one or more dimensional measurement devices to perform a machining operation on the workpiece in response to identifying the calibration requirement is satisfied for each of the one or more dimensional measurement devices.

19 Claims, 4 Drawing Sheets

(51) Int. Cl.
*B25J 11/00* (2006.01)
*G01B 21/04* (2006.01)

(58) Field of Classification Search
CPC ........ G05B 2219/37008; G05B 19/401; G05B 2219/37009; G05B 2219/37017; G05B 2219/39012; G05B 2219/39024; G05B 2219/39026; G05B 2219/39032
USPC .... 73/1.79, 1.81, 105, 865.8, 865.9; 33/655, 33/545–547, 556, 558; 83/66, 74, 76.7, 83/76.8, 362, 371, 522.18; 144/389, 399, 144/411, 416; 348/86, 94, 95; 356/614, 356/625, 634, 635
See application file for complete search history.

(56) References Cited

U.S. PATENT DOCUMENTS

| | | | | |
|---|---|---|---|---|
| 6,449,526 | B1 | 9/2002 | Sachs | |
| 8,452,073 | B2 | 5/2013 | Taminger | |
| 10,025,289 | B2 | 7/2018 | Blais | |
| 10,921,782 | B2 | 2/2021 | Mehr | |
| 10,955,238 | B1 | 3/2021 | Jones | |
| 11,537,100 | B2 | 12/2022 | Chang | |
| 11,556,107 | B2 | 1/2023 | Chang | |
| 2011/0280472 | A1* | 11/2011 | Wallack | G06T 7/80 901/14 |
| 2017/0045357 | A1 | 2/2017 | Lummes | |
| 2021/0008724 | A1 | 1/2021 | Qian | |
| 2021/0140753 | A1 | 5/2021 | Eckardt | |

FOREIGN PATENT DOCUMENTS

| | | | | | |
|---|---|---|---|---|---|
| GB | 2515657 | A | | 12/2014 | |
| JP | H07120216 | A | | 5/1995 | |
| JP | 2015006721 | A | * | 1/2015 | G01B 11/22 |
| JP | 7296279 | B2 | * | 6/2023 | G01B 11/026 |
| WO | WO-2008102109 | A1 | * | 8/2008 | G01B 21/042 |

* cited by examiner

MACHINING SYSTEM AND METHOD FOR VALIDATING DIMENSIONAL MEASUREMENT DEVICE OPERATION

TECHNICAL FIELD

This disclosure relates generally to machining systems, more particularly, to systems and methods for validating dimensional measurement device operation for machining systems.

BACKGROUND OF THE ART

Machining systems may be used to accomplish one or more workpiece machining (e.g., drilling, grinding, milling, polishing, three-dimensional (3D) printing, etc.) operations for component manufacture. Various machining systems and methods are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a machining system includes a machining assembly, one or more dimensional measurement devices, and a controller. The machining assembly includes an arm and a machining tool. The arm is operable to move the machining tool relative to a workpiece. Each dimensional measurement device of the one or more dimensional measurement devices is operable to measure one or both of a position or a dimension of the workpiece. The controller is in signal communication with the machining system and the one or more dimensional measurement devices. The controller includes a processor in communication with a non-transitory memory storing instructions, which instructions when executed by the processor, cause the processor to identify the one or more dimensional measurement devices connected in signal communication with the controller, identify a calibration requirement for each of the one or more dimensional measurement devices, identify the calibration requirement is satisfied or unsatisfied for each of the one or more dimensional measurement devices, and control the arm, the machining tool, and the one or more dimensional measurement devices to perform a machining operation on the workpiece in response to identifying the calibration requirement is satisfied for each of the one or more dimensional measurement devices.

In any of the aspects or embodiments described above and herein, the one or more dimensional measurement devices may include a touch probe.

In any of the aspects or embodiments described above and herein, the one or more dimensional measurement devices may include an optical-imaging dimensional measurement sensor.

In any of the aspects or embodiments described above and herein, the machining system may further include a calibration system including at least one artifact. The at least one artifact may have one or both of a calibration position having a predetermined position value stored in the memory or a calibration dimension having a predetermined dimension value stored in the memory.

In any of the aspects or embodiments described above and herein, the instructions, when executed by the processor, may further cause the processor to perform a calibration for a first dimensional measurement device of the one or more dimensional measurement devices in response to identifying the calibration requirement is unsatisfied for the first dimensional measurement device.

In any of the aspects or embodiments described above and herein, the instructions, when executed by the processor, may further cause the processor to perform the calibration for the first dimensional measurement device by controlling the first dimensional measurement device to measure one or both of the calibration position or the calibration dimension and comparing a measured value of one or both of the calibration position or the calibration dimension to one or both of the predetermined position value or the predetermined dimension value, respectively, to determine a calibration correction value for the first dimensional measurement device.

In any of the aspects or embodiments described above and herein, the instructions, when executed by the processor, may further cause the processor to identify the one or more dimensional measurement devices connected in signal communication with the controller by identifying each dimensional measurement device of a subset of the one or more dimensional measurement devices. The subset of the one or more dimensional measurement devices may be identified in the instructions for performing the machining operation on the workpiece.

In any of the aspects or embodiments described above and herein, the calibration requirement may be a periodicity calibration requirement.

In any of the aspects or embodiments described above and herein, the calibration requirement may be unique to the workpiece.

In any of the aspects or embodiments described above and herein, the calibration requirement may be a maintenance calibration requirement.

In any of the aspects or embodiments described above and herein, the instructions may be computer numeric control (CNC) instructions for the machining operation.

According to another aspect of the present disclosure, a method for validating dimensional measurement device operation for a machining system is provided. The method includes identifying, with a controller, each dimensional measurement device of the machining system for performing a machining operation on a workpiece, identifying, with the controller, a calibration requirement for each identified dimensional measurement device, identifying, with the controller, the calibration requirement is satisfied for each identified dimensional measurement device, and controlling the machining system to perform the machining operation on the workpiece using each identified dimensional measurement device subsequent to identifying, with the controller, the calibration requirement is satisfied for each identified dimensional measurement device.

In any of the aspects or embodiments described above and herein, identifying each dimensional measurement device includes verifying signal communication between the controller and each dimensional measurement device.

In any of the aspects or embodiments described above and herein, the method may further include performing a readiness check for each dimensional measurement device subsequent to identifying the calibration requirement is satisfied and prior to controlling the machining system to perform the machining operation on the workpiece.

In any of the aspects or embodiments described above and herein, the method may further include generating a human intervention warning response to a failure of the readiness check for one of the at least one dimensional measurement device.

In any of the aspects or embodiments described above and herein, identifying each dimensional measurement device, identifying the calibration requirement for each identified dimensional measurement device, identifying the calibration requirement is satisfied for each identified dimensional measurement device, and controlling the machining system to perform the machining operation on the workpiece using each identified dimensional measurement device may be performed by the controller using computer numeric control (CNC) instructions for the workpiece.

In any of the aspects or embodiments described above and herein, the calibration requirement may be a periodicity calibration requirement.

In any of the aspects or embodiments described above and herein, the calibration requirement may be unique to the workpiece.

In any of the aspects or embodiments described above and herein, the calibration requirement may be a maintenance calibration requirement.

In any of the aspects or embodiments described above and herein, the method may further include identifying, with the controller, the calibration requirement is satisfied for each identified dimensional measurement device subsequent to controlling the machining system to perform the machining operation on the workpiece.

The present disclosure, and all its aspects, embodiments and advantages associated therewith will become more readily apparent in view of the detailed description provided below, including the accompanying drawings.

DETAILED DESCRIPTION

Figure 1:
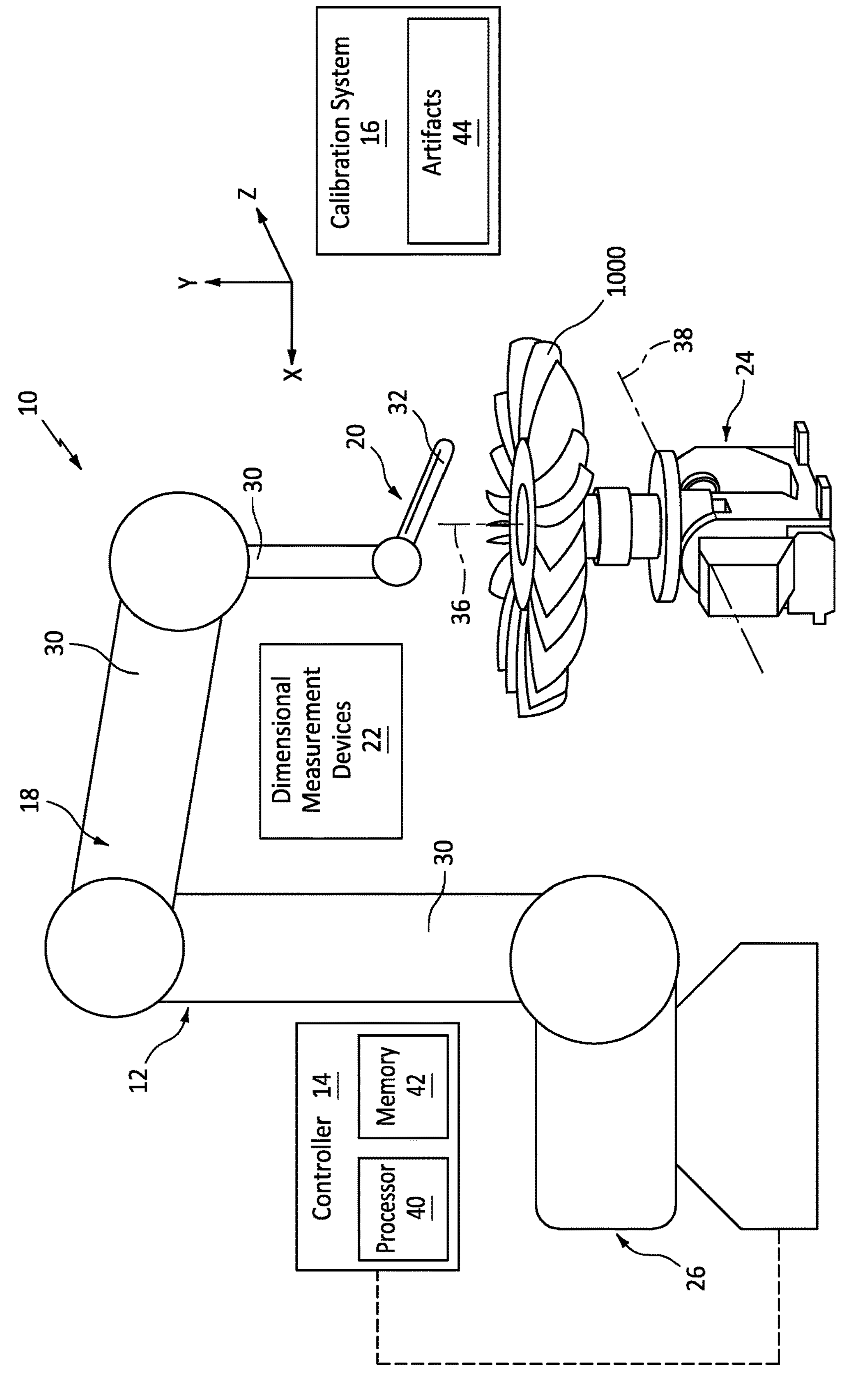
FIG. 1 diagrammatically illustrates a machining system, in accordance with one or more embodiments of the present disclosure.

FIG. 1 illustrates a machining system 10. The machining system 10 of FIG. 1 is a computer numeric control (CNC) machining system configured for automated control of one or more machining tools for use in the manufacture, repair, or machining of a workpiece 1000. As an example, the workpiece 1000 of FIG. 1 is a bladed disk ("blisk") for a gas turbine engine fan for an aircraft propulsion system. The present disclosure, however, is not limited to any particular workpiece 1000 type, configuration, or material. The machining system 10 of FIG. 1 includes a machining assembly 12, a controller 14, one or more dimensional measurement devices 22, and a calibration system 16.

The machining assembly 12 of FIG. 1 is configured as a robotic machining assembly. The machining assembly 12 provides automated control of one or more machining tools (e.g., drilling tools, turning tools, grinding tools, milling tools, polishing tools, three-dimensional (3D) printing tools, dimensional metrology probes, etc.) based on coded programming instructions executed by a controller (e.g., the controller 14). The machining assembly 12 of FIG. 1 includes an arm 18 (e.g., a robotic arm), an end effector 20. The machining assembly 12 may further include a workpiece positioning fixture 24. To be clear, the machining assembly 12 configuration of FIG. 1 is exemplary, and the present disclosure machining system 10 is not limited to use with the particular machining assembly 12 configuration of FIG. 1 (e.g., the machining system 10 may be used with other machining assembly configurations such as those without robotic arms).

The arm 18 includes a base end 26, a distal end 28, and one or more movable joints 30 between the base end 26 and the distal end 28. Each movable joint 30 may be moved or otherwise controlled, for example, by an independent servo motor or other actuator (not shown). The distal end 28 may be connected to the end effector 20. The arm 18 is configured move the end effector 20 relative to the workpiece 1000 and/or to another component or system (e.g., the calibration system 16) of the machining system 10. For example, the arm 18 may be configured to move the end effector 20 along an x-axis, a y-axis, and a z-axis, as well as to rotate the end effector 20 relative to the x-axis, the y-axis, and the z-axis (e.g., pitch, yaw, and roll).

The end effector 20 is mounted to or otherwise disposed at the distal end 28. The end effector 20 may be configured to be selectively attachable to and detachable from the distal end 28. The end effector 20 includes a machining tool 32. The machining tool 32 may be attached to or formed by the end effector 20. Examples of the machining tool 32 include drilling tools, laser sources (e.g., laser perforation sources), grinding tools, milling tools, polishing tools, 3D printing tools, dimensional metrology probes (e.g., the dimensional measurement devices 22), and the like, and the present disclosure is not limited to the aforementioned exemplary machining tools.

Figure 2B:
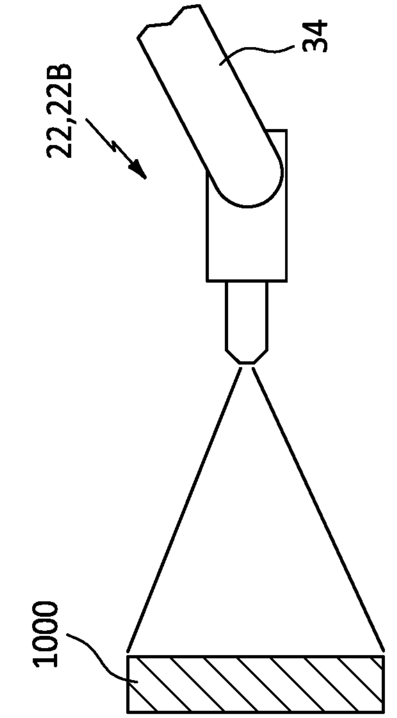
FIGS. 2A-B diagrammatically illustrate dimensional measurement devices for a machining system, in accordance with one or more embodiments of the present disclosure.
Figure 2A:
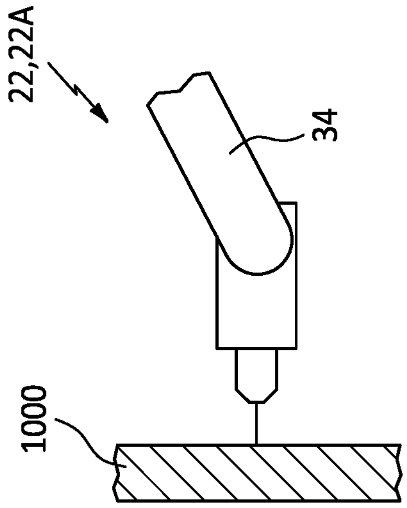

FIGS. 2A-B illustrate configurations of the dimensional measurement devices 22. The dimensional measurement devices 22 are configured to measure dimensions (e.g., length, height, thickness, etc.), geometric features, and/or positions and orientations of the workpiece 1000. The dimensional measurement device 22 of FIG. 2A is configured as a touch probe 22A. The dimensional measurement device 22 of FIG. 2B is configured as an optical-imaging dimensional measurement sensor 22B. The touch probe 22A of FIG. 2A is configured to identify positions of the workpiece 1000 (e.g., workpiece surface positions) relative to a three-dimensional coordinate space based on physical contact with the workpiece 1000. For example, the touch probe 22A may be used to measure the shape, size, curvature, and other geometric features of the workpiece 1000 by sensing (e.g., contacting) discrete points on surfaces of the workpiece 1000. The touch probe 22A may be positioned relative to the workpiece 1000 by a positioning device 34 of the machining system 10. The positioning device 34 may include the machining assembly 12 (e.g., the arm 18 and the end effector 20) or a discrete positioning device (e.g., arm, motorized tool spindle, etc.) independent of the machining assembly 12. The optical-imaging dimensional measurement sensor 22B may be configured to identify positions of the workpiece 1000 (e.g., workpiece surface positions) relative to a three-dimensional coordinate space without physical contact with the workpiece 1000. For example, the optical-imaging dimensional measurement sensor 22B may be used to capture two-dimensional (2D) images of the workpiece 1000 measure the shape, size, curvature, and other geometric features of the workpiece 1000. The present disclosure, however, is not limited to the foregoing exemplary dimensional measurement device 22 configurations, and the dimensional measurement device 22 may include any dimensional measurement device configured to communicate with the controller 14 to measure geometric characteristics of the workpiece 1000 such as, but not limited to, coordinate-measuring machines (CMMs), contact scanning probes, non-contact probes, laser trackers, machine vision systems, optical scanners, optical comparators, and the like.

Referring again to FIG. 1, the workpiece positioning fixture 24 may be configured to securely retain and position the workpiece 1000 for a machining process executed by the machining system 10. The workpiece positioning fixture 24 may be configured to rotate or pivot the workpiece 1000 about one or more axes. For example, the workpiece positioning fixture 24 may be configured to rotate the workpiece about a first axis 36. The workpiece positioning fixture 24 may additionally or alternatively be configured to pivot (e.g., tilt) the workpiece 1000 about a second axis 38. The second axis 38 may be perpendicular to the first axis 36.

The controller 14 of FIG. 1 is connected in signal communication with the machining assembly 12 (e.g., the arm 18, the end effector 20, and the dimensional measurement devices 22). The controller 14 may additionally be connected in signal communication with the calibration system 16. The controller 14 includes a processor 40 and memory 42. The memory 42 is connected in signal communication with the processor 40. The processor 40 may include any type of computing device, computational circuit, or any type of process or processing circuit capable of executing a series of instructions that are stored in the memory 42, thereby causing the processor 40 to perform or control one or more steps or other processes. The processor 40 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 42 may represent one or more algorithms for controlling aspects of the machining assembly 12 and/or the calibration system 16, and the stored instructions are not limited to any particular form (e.g., program files, system data, buffers, drivers, utilities, system programs, etc.) provided they can be executed by the processor 40. The instructions stored in memory 42 may be in the form of a CNC programming language (e.g., G-code, M-code, etc.), or another suitable programming language which can be executed by the controller 14 and/or its processor 40. The CNC programming language instructions may be executed by the processor 40, for example, to control positioning, movement speed, and a tool path for the machining tool 32. The instructions stored in memory 42 may be generated by computer-aided design (CAD) or computer-aided manufacturing (CAM) software, whereby the physical dimensions of a particular workpiece (e.g., the workpiece 1000) may be translated into instructions (e.g., computer numeric control (CNC) instructions) for execution by the machining assembly 12. The memory 42 may be a non-transitory computer readable storage medium configured to store instructions that when executed by one or more processors, cause the one or more processors to perform or cause the performance of certain functions. The memory 42 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 14 may be achieved via the use of hardware, software, firmware, or any combination thereof. The controller 14 may also include input and output devices (e.g., keyboards, buttons, switches, touch screens, video monitors, sensor readouts, data ports, etc.) that enable the operator to input instructions, receive data, etc.

The calibration system 16 is configured for calibration of the dimensional measurement devices 22 to verify precision and/or repeatability characteristics of the dimensional measurement devices 22. The calibration system 16 of FIG. 1 includes one or more artifacts 44. Each of the artifacts 44 has one or more known calibration positions (e.g., surface positions) and/or known calibration dimensions (e.g., a known length, a known width, a known area, etc.) which may be used to verify the precision and/or repeatability characteristics of the dimensional measurement devices 22. The artifacts 44 may be positionally fixed relative to the machining assembly 12 and/or the dimensional measurement devices 22. Alternatively, the artifacts 44 may be movable. For example, the machining assembly 12 may be configured to pick up and position the artifacts 44 relative to the dimensional measurement devices 22.

In conventional CNC machining processes, there may be many manual interventions (e.g., human interventions) before, during, and after the machining processes to address dimensional measurement device operation and calibration complications. These manual interventions add considerable time to the machining process for a workpiece, and additionally contribute to manpower requirements. Moreover, manual interventions to address dimensional measurement device operation and calibration complications may be subject to error and may, therefore, result in machined workpieces which may be rejected.

Figure 3:
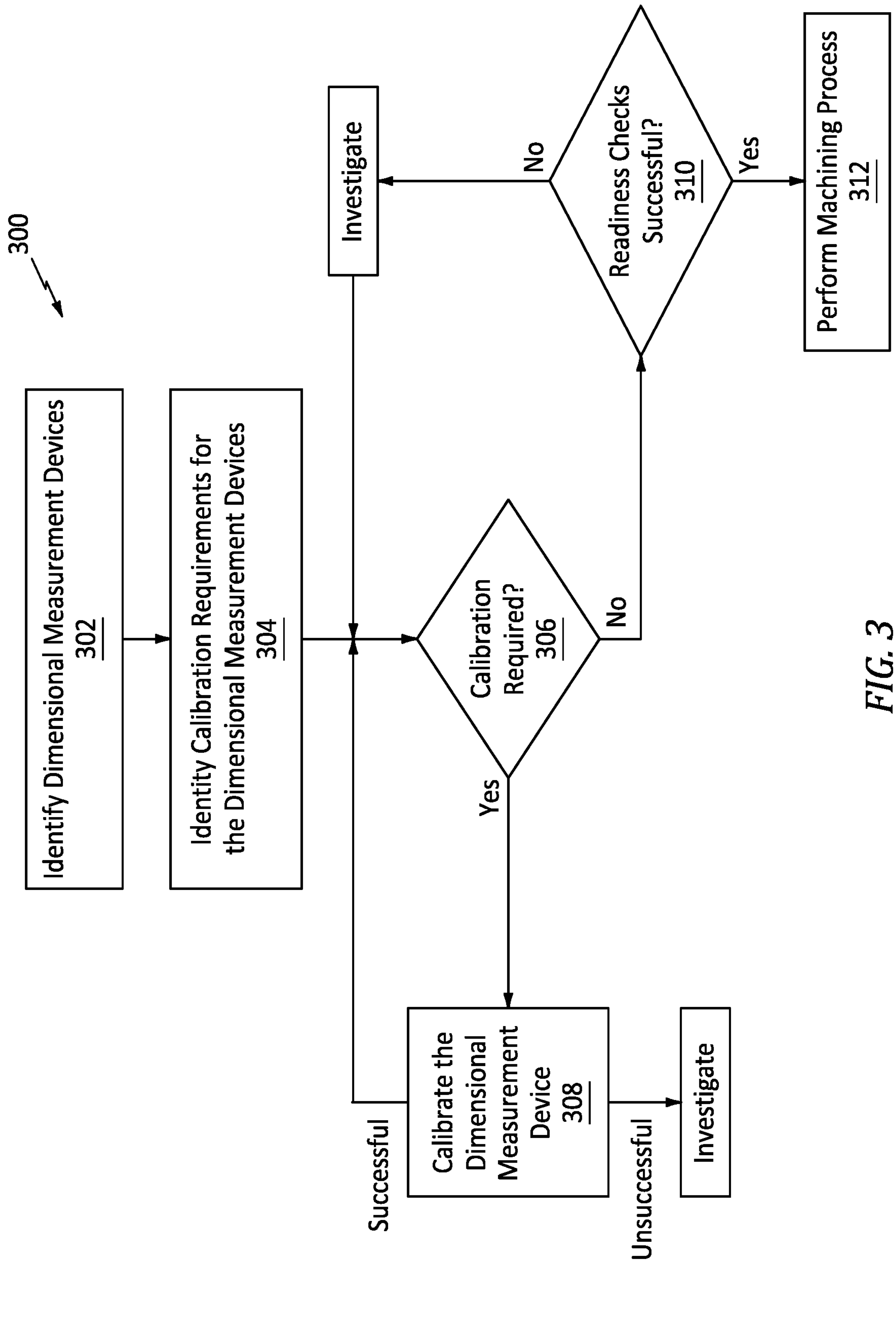
FIG. 3 illustrates a flow chart depicting a method for validating dimensional measurement device operation for a machining system, in accordance with one or more embodiments of the present disclosure.

Referring to FIG. 3, a Method 300 for validating dimensional measurement device operation for a machining system is provided. FIG. 3 illustrates a flowchart for the Method 300. The Method 300 may be performed for the machining system 10, as described herein. The controller 14 may be used to execute or control one or more steps of the Method 300. For example, the processor 40 may execute instructions stored in memory 42, thereby causing the controller 14 and/or its processor 40 to execute or otherwise control one or more steps of the Method 300 using the machining assembly 12 and/or the calibration system 16. However, it should be understood that the Method 300 is not limited to use with the machining system 10 described herein. Unless otherwise noted herein, it should be understood that the steps of Method 300 are not required to be performed in the specific sequence in which they are discussed below and, in various embodiments, the steps of Method 300 may be performed separately or simultaneously. Further, it should be understood that not all of the steps of the method 300, discussed below, may be required unless otherwise described herein.

Step 302 includes identifying the dimensional measurement devices 22 of the machining system 10 with the controller 14. For example, the controller 14 may identify one, more than one, or each of the dimensional measurement devices 22 of the machining system 10 connected in signal communication with the controller 14. The instructions for identifying the dimensional measurement devices 22 may be included in the CNC programming language instructions (hereinafter "CNC instructions") used by the controller 14 to control a machining or other manufacturing process for the workpiece 1000 (see FIG. 1). The CNC instructions may specify the dimensional measurement devices 22 which will be used (e.g., controlled by the controller 14 executing the CNC instructions) during the machining or other manufacturing process for the workpiece 1000. The dimensional measurement devices 22 specified by the CNC instructions for the workpiece 1000 may be a subset (e.g., less than all of) the dimensional measurement devices 22 connected in signal communication with the controller 14. Identifying the dimensional measurement devices 22 may include verifying, with the controller 14, signal communication between the controller 14 and the dimensional measurement devices 22. The controller 14 (e.g., executing the CNC instructions for the workpiece 1000) may identify the dimensional measurement devices 22 upon initiation of the machining or other manufacturing process instructions (e.g., CNC instructions) for the workpiece 1000. For example, the controller 14 may identify the dimensional measurement devices 22 prior to applying a machining or other manufacturing tool to the workpiece 1000 (e.g., with the machining assembly 12).

Step 304 includes identifying one or more calibration requirements for the dimensional measurement devices 22. For example, the controller 14 may identify one or more calibration requirements for each of the dimensional measurement devices 22 identified by the controller 14 in Step 302. The one or more calibration requirements for each of the dimensional measurement devices 22 may be included in the CNC instructions executed by the controller 14 to control the machining or other manufacturing process for the workpiece 1000 (see FIG. 1). The calibration requirement for each of the dimensional measurement devices 22 identifies a condition for determining that a calibration procedure for the respective dimensional measurement device 22 may or may not be performed. For each of the identified dimensional measurement devices 22, the controller 14 may identify one or more calibration requirements such as, but not limited to, a periodicity calibration requirement, a workpiece-specific calibration requirement, and/or a maintenance calibration requirement. A periodicity calibration requirement may identify an amount of time, an amount of machining system 10 run hours, an amount of workpieces manufactured by the machining system 10, and/or another requirement for periodic calibration of the dimensional measurement devices 22. The workpiece-specific calibration requirement may identify a calibration requirement associated with the particular workpiece 1000 to be machined or otherwise manufactured by the machining system 10. In other words, the workpiece-specific calibration requirement may be unique to the workpiece 1000 and included in the CNC instructions for the workpiece 1000. For example, for high-importance, high-value, and/or high-precision workpieces 1000, the workpiece-specific calibration requirement may require one, more than one, or each of the identified measurement devices 22 for the workpiece 1000 to be calibrated (e.g., prior to use of the identified measurement devices 22 for the workpiece 1000). The maintenance calibration requirement may require dimensional measurement device 22 calibration in response to maintenance or other disruption (e.g., physical disturbance, loss of electrical power, loss of signal communication, etc.) for the dimensional measurement device 22. The calibration requirement for each of the identified dimensional measurement devices 22 may be different than the calibration requirement for one or more other identified dimensional measurement devices 22. The calibration requirement for each of the identified dimensional measurement devices 22 may additionally include a type of calibration (e.g., a full calibration, a partial calibration, a repeatability calibration check, a precision calibration check, etc.).

Step 306 includes identifying whether the one or more calibration requirements are satisfied or unsatisfied for each of the identified dimensional measurement devices 22. For example, the controller 14 may identify the one or more calibration requirements for each of the identified dimensional measurement devices 22 is satisfied or unsatisfied. The controller 14 may identify the one or more calibration requirements are satisfied or unsatisfied using dimensional measurement device 22 status information stored in the memory 42 such as, but not limited to, a date and time a last calibration was performed for the dimensional measurement device 22, an amount of machining system 10 run hours for which a last calibration was performed for the dimensional measurement device 22, an indication of maintenance or other disruption for the dimensional measurement device 22 since the last calibration was performed for the dimensional measurement device 22, or the like. Instructions for identifying the one or more calibration requirements for each of the identified dimensional measurement devices 22 is satisfied or unsatisfied may be included in the CNC instructions executed by the controller 14 to control the machining or other manufacturing process for the workpiece 1000 (see FIG. 1). Identifying calibration requirements and satisfaction of the calibration requirements for each of the identified dimensional measurement devices 22 may be performed upon initiation of the machining or other manufacturing process instructions (e.g., CNC instructions) for the workpiece 1000. For example, the controller 14 may identify the calibration requirements and satisfaction of the calibration requirements for each of the identified dimensional measurement devices 22 following (e.g., immediately following) identification of the dimensional measurement devices 22 (see Step 302). However, the controller 14 may additionally or alternatively identify the calibration requirements and satisfaction of the calibration requirements for each of the identified dimensional measurement devices 22 at one or more intermediate stages or at a completion of the machining or other manufacturing process instructions (e.g., CNC instructions) for the workpiece 1000.

Figure 4B:
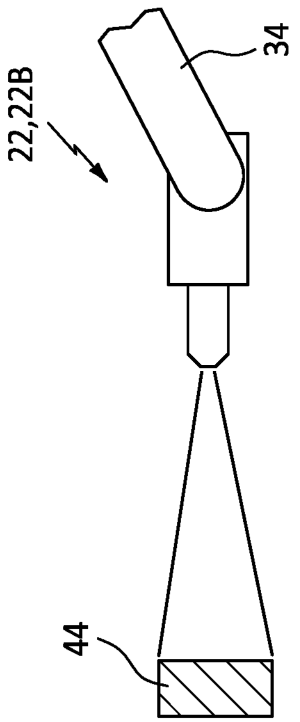
FIGS. 4A-B diagrammatically illustrate the dimensional measurement devices of FIGS. 2A-B during a calibration, in accordance with one or more embodiments of the present disclosure.
Figure 4A:
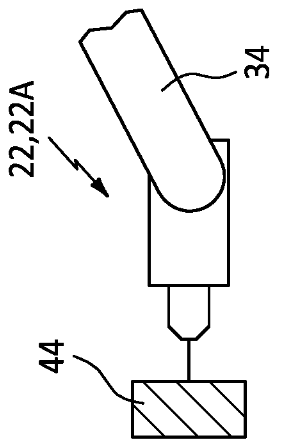

Step 308 includes performing a calibration for each of the identified dimensional measurement devices 22 having an unsatisfied calibration requirement. For example, in response to identifying one or more calibration requirements for one of the identified dimensional measurement devices 22 is unsatisfied, the controller 14 may initiate and control the calibration of the respective identified dimensional measurement device 22. The CNC instructions, executed by the controller 14, may cause the controller 14 (e.g., the processor 40) to execute a calibration subprogram in response to identification of an unsatisfied calibration requirement for the respective dimensional measurement device 22. The controller 14 may control the machining assembly 12, the calibration system 16, and/or the dimensional measurement device 22 to perform a calibration of the respective dimensional measurement device 22. For example, as shown in FIGS. 4A-B, the controller 14 may control the dimensional measurement device 22 (e.g., the touch probe 22A of FIG. 4A or the optical-imaging dimensional measurement sensor 22B of FIG. 4B) to measure the one or more calibration positions and/or one or more calibration dimensions of one or more of the artifacts 44 (see FIG. 1) having predetermined position and/or dimension values (e.g., stored in memory 42). The controller 14 may control the positioning device 34 to position the dimensional measurement device 22 in contact with or otherwise relative to the artifacts 44 to measure the one or more positions and/or one or more dimensions of the artifacts 44.

Measured values of the one or more calibration positions and/or the one or more calibration dimensions, determining using the dimensional measurement device 22 may be compared to the respective known values of the one or more calibration positions and/or the one or more calibration dimensions. Differences between the measured values and the known values of the one or more calibration positions and/or the one or more calibration dimensions may be used by the controller 14 to determine a calibration correction value for the dimensional measurement device 22. The calibration correction value may be stored (e.g., in memory 42) for the dimensional measurement device 22. The controller 14 may subsequently apply the calibration correction value to positions and/or dimensions measured using the dimensional measurement device 22 to determine a corrected measured value of positions and/or dimensions measured using the dimensional measurement device 22. The controller 14 may again identify whether the one or more calibration requirements are satisfied or unsatisfied for each of the identified dimensional measurement devices 22 (see Step 306) in response to performance of the calibration for one of the dimensional measurement devices 22.

Step 310 includes, optionally, performing a readiness check for each of the identified dimensional measurement devices 22 once the calibration requirements for each of the identified dimensional measurement devices 22 have been identified as satisfied (see Step 306). For example, the controller 14 may perform one or more readiness checks for each of the identified dimensional measurement devices 22 such as, but not limited to, a movement check, an electrical power check, a signal communication check, a physical integrity check, and/or a dimensional measurement device 22 life cycle check. The controller 14 may additionally or alternatively perform a calibration check for each of the identified dimensional measurement devices 22. For example, the controller 14 may compare corrected measured values of the one or more calibration positions and/or the one or more calibration dimensions of the artifacts 44 to predetermined threshold ranges of the one or more calibration positions and/or the one or more calibration dimensions of the artifacts 44 to identify a valid or invalid calibration of the dimensional measurement device 22. The controller 14 may measure the one or more calibration positions and/or one or more calibration dimensions of the artifacts 44 with the dimensional measurement device 22 a plurality of times to verify repeatability of the dimensional measurement device 22 measurements. The controller 14 may identify a valid calibration if measured values of the one or more positions and/or the one or more dimensions of the artifacts 44 are within the predetermined threshold ranges. The controller 14 may identify an invalid calibration if measured values of the one or more positions and/or the one or more dimensions of the artifacts 44 are outside of the predetermined threshold ranges. In response to identification of the unsuccessful calibration for the dimensional measurement device 22, the controller 14 may perform a calibration (see Step 308) for the dimensional measurement device 22 identified as having an invalid calibration. In response to a failure of one or more of the readiness checks, the controller 14 may initiate a request for a human intervention to investigate the cause of the readiness check failure for the respective one of the identified dimensional measurement devices 22. For example, the controller 14 may generate a warning (e.g., an audible alarm, a warning light, an error message, etc.) identifying a request for human intervention.

Step 312 includes performing a machining or other manufacturing operation with the machining assembly 12 and the dimensional measurement devices 22. For example, the controller 14 execute the instructions stored in memory 42 (e.g., the CNC instructions) control the machining assembly 12 and the dimensional measurement devices 22 to perform a machining operation for the workpiece 1000. The machining or other manufacturing operation of Step 312 may be performed in combination with one or more of the above-discussed steps of the Method 300. The Steps 302, 304, 306, 308, and 310 may be repeatedly performed (e.g., at periodic intervals) during the machining or other manufacturing operation.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A machining system comprising:

a machining assembly including an arm and a machining tool, and the arm is operable to move the machining tool relative to a workpiece;

one or more dimensional measurement devices, and each dimensional measurement device of the one or more dimensional measurement devices is operable to measure one or both of a position or a dimension of the workpiece; and a controller in signal communication with the machining system and the one or more dimensional measurement devices, and the controller includes a processor in communication with a non-transitory memory storing instructions, which instructions when executed by the processor, cause the processor to:

determine the one or more dimensional measurement devices connected in signal communication with the controller;

determine a calibration requirement for each of the one or more dimensional measurement devices;

determine the calibration requirement is satisfied or unsatisfied for each of the one or more dimensional measurement devices; and control the arm, the machining tool, and the one or more dimensional measurement devices to perform a machining operation on the workpiece in response to determining the calibration requirement is satisfied for each of the one or more dimensional measurement devices, wherein:

the instructions are computer numeric control (CNC) instructions for the machining operation; and the calibration requirement for each of the one or more dimensional measurement devices is included in the CNC instructions.

2. The machining system of claim 1, wherein the one or more dimensional measurement devices includes a touch probe.

3. The machining system of claim 1, wherein the one or more dimensional measurement devices includes an optical-imaging dimensional measurement sensor.

4. The machining system of claim 1, further comprising a calibration system including at least one artifact, the at least one artifact has one or both of:

a calibration position having a predetermined position value stored in the non-transitory memory; or a calibration dimension having a predetermined dimension value stored in the non-transitory memory.

5. The machining system of claim 4, wherein the instructions, when executed by the processor, further cause the processor to perform a calibration for a first dimensional measurement device of the one or more dimensional measurement devices in response to determining the calibration requirement is unsatisfied for the first dimensional measurement device.

6. The machining system of claim 5, wherein the instructions, when executed by the processor, further cause the processor to perform the calibration for the first dimensional measurement device by:

controlling the first dimensional measurement device to measure one or both of the calibration position or the calibration dimension; and comparing a measured value of one or both of the calibration position or the calibration dimension to one or both of the predetermined position value or the predetermined dimension value, respectively, to determine a calibration correction value for the first dimensional measurement device.

7. The machining system of claim 1, wherein the instructions, when executed by the processor, further cause the processor to determine the one or more dimensional measurement devices connected in signal communication with the controller by determining each dimensional measurement device of a subset of the one or more dimensional measurement devices, and the subset of the one or more dimensional measurement devices is identified in the instructions for performing the machining operation on the workpiece.

8. The machining system of claim 1, wherein the calibration requirement is a periodicity calibration requirement.

9. The machining system of claim 1, wherein the calibration requirement is unique to the workpiece.

10. The machining system of claim 1, wherein the calibration requirement is a maintenance calibration requirement.

11. A method for validating dimensional measurement device operation for a machining system, the method comprising:

determining, with a controller, each dimensional measurement device of at least one dimensional measurement device of the machining system for performing a machining operation on a workpiece;

determining, with the controller, a calibration requirement for each identified dimensional measurement device;

determining, with the controller, the calibration requirement is satisfied for each identified dimensional measurement device; and controlling the machining system to perform the machining operation on the workpiece using each identified dimensional measurement device subsequent to determining, with the controller, the calibration requirement is satisfied for each identified dimensional measurement device, wherein:

the steps of determining each dimensional measurement device, determining the calibration requirement for each identified dimensional measurement device, determining the calibration requirement is satisfied for each identified dimensional measurement device, and controlling the machining system to perform the machining operation on the workpiece using each identified dimensional measurement device are performed by the controller using computer numeric control (CNC) instructions for the workpiece; and the calibration requirement for each of the at least one dimensional measurement device is included in the CNC instructions.

12. The method of claim 11, wherein determining each dimensional measurement device includes verifying signal communication between the controller and each dimensional measurement device.

13. The method of claim 11, further comprising performing a readiness check for each dimensional measurement device subsequent to determining the calibration requirement is satisfied and prior to controlling the machining system to perform the machining operation on the workpiece.

14. The method of claim 13, further comprising generating a human intervention warning response to a failure of the readiness check for one of the at least one dimensional measurement device.

15. The method of claim 11, wherein the calibration requirement is a periodicity calibration requirement.

16. The method of claim 11, wherein the calibration requirement is unique to the workpiece.

17. The method of claim 11, wherein the calibration requirement is a maintenance calibration requirement.

18. The method of claim 11, further comprising determining, with the controller, the calibration requirement is satisfied for each identified dimensional measurement device subsequent to controlling the machining system to perform the machining operation on the workpiece.

19. A machining system comprising:

a machining assembly including an arm and a machining tool, and the arm is operable to move the machining tool relative to a workpiece;

one or more dimensional measurement devices, each dimensional measurement device of the one or more dimensional measurement devices is operable to measure one or both of a position or a dimension of the workpiece, and the one or more dimensional measurement devices includes a touch probe; and a controller in signal communication with the machining system and the one or more dimensional measurement devices, and the controller includes a processor in communication with a non-transitory memory storing instructions, which instructions when executed by the processor, cause the processor to:

determine the one or more dimensional measurement devices connected in signal communication with the controller;

determine a calibration requirement for each of the one or more dimensional measurement devices;

determine the calibration requirement is satisfied or unsatisfied for each of the one or more dimensional measurement devices; and control the arm, the machining tool, and the one or more dimensional measurement devices to perform a machining operation on the workpiece in response to determining the calibration requirement is satisfied for each of the one or more dimensional measurement devices.

* * * * *